United States Patent
Schulz et al.

(10) Patent No.: US 12,210,523 B2
(45) Date of Patent: Jan. 28, 2025

(54) ARBITRARY DIRECTORY DATA PROPERTIES IN SQL-BASED DIRECTORY SYSTEMS

(71) Applicant: MICROSOFT TECHNOLOGY LICENSING, LLC, Redmond, WA (US)

(72) Inventors: Michael Henry Schulz, Raleigh, NC (US); Anish Agarwal, Bothell, WA (US); Shruti Kasetty, Bellevue, WA (US); Patrick Moulhaud, Seattle, WA (US); Carly Larsson, Issaquah, WA (US); Tengyu Wang, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 135 days.

(21) Appl. No.: 17/984,184

(22) Filed: Nov. 9, 2022

(65) Prior Publication Data
US 2024/0152514 A1    May 9, 2024

(51) Int. Cl.
G06F 16/24 (2019.01)
G06F 16/2453 (2019.01)

(52) U.S. Cl.
CPC .. *G06F 16/24537* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 2003/0208509 A1* | 11/2003 | Komine | G06F 16/289 |
| 2003/0233347 A1* | 12/2003 | Weinberg | G06F 16/22 |
| 2007/0027858 A1* | 2/2007 | Weinberg | G06F 16/2428 |
| 2009/0144320 A1* | 6/2009 | Weinberg | G06F 16/284 |
| | | | 707/999.102 |

\* cited by examiner

*Primary Examiner* — Belix M Ortiz Ditren
(74) *Attorney, Agent, or Firm* — Newport IP, LLC; Jacob P. Rohwer

(57) ABSTRACT

The techniques disclosed herein enhance the efficiency and functionality of directory systems. This is accomplished by augmenting a primary table with an extended table for storing properties of an associated entity (e.g., a user, a company). A table serves to organize directory data and comprises rows and columns. Each row of the primary table stores an entity with each column storing an associated property. In contrast, the primary table is configured with an extended table in which each row of the extended table stores a property for an associated entity while each column stores additional information for the property such as timestamps and metadata. Storing specific properties in the extended table eliminates empty spaces in the primary table thereby reducing the volume of stored data. Moreover, by including additional data for properties, the extended table enables property-specific features such as search, synchronization, extensibility, and lifecycle management.

14 Claims, 9 Drawing Sheets

PRIMARY TABLE 102

| ENTITY ID 106 | USERNAME 108 | FIRST NAME 110 | LAST NAME 112 | CITY 114 | DEPARTMENT 116 | ENABLED 118 |
|---|---|---|---|---|---|---|
| 0 | ASEN | AYRTON | SENNA | SAO PAOLO | FINANCE | FALSE |
| 1 | ACME | | | SEATTLE | | TRUE |
| 2 | MSCH | MICHAEL | SCHUMACHER | BERN | HUMAN RESOURCES | TRUE |
| 3 | NLAU | NIKI | LAUDA | VIENNA | OPERATIONS | FALSE |
| 4 | CONTOSO | | | SUNNYVALE | | TRUE |
| 5 | LHAM | LEWIS | HAMILTON | MONACO | ENGINEERING | TRUE |

EXTENDED TABLE 104
ENTITY PROPERTIES 120
PROPERTY VALUE(S) 122
OPERATION SET 124

100

PRIMARY TABLE 202

| ENTITY ID 106 | USERNAME 108 | CITY 114 | ENABLED 118 |
|---|---|---|---|
| 0 | ASEN | SAO PAOLO | FALSE |
| 1 | ACME | SEATTLE | TRUE |
| 2 | MSCH | BERN | TRUE |
| 3 | NLAU | VIENNA | FALSE |
| 4 | CONTOSO | SUNNYVALE | TRUE |
| 5 | LHAM | MONACO | TRUE |

EXTENDED TABLE 104

| PROPERTY ID 204 | PROPERTY VALUE 206 | ENTITY ID 208 | ENTITY TYPE 210 | CHANGE TIME 212 |
|---|---|---|---|---|
| CITY | SAO PAOLO | 0 | USER | 05/01/09 15:45 |
| FIRST NAME | AYRTON | 0 | USER | 09/29/09 09:05 |
| LAST NAME | SENNA | 0 | USER | 09/29/09 09:05 |
| JOB TITLE | SENIOR VP | 0 | USER | 12/18/21 16:05 |
| DEPARTMENT | FINANCE | 0 | USER | 10/21/09 07:00 |
| USERNAME | ASEN | 0 | USER | 10/21/09 07:01 |
| DELETION | TRUE | 0 | USER | 07/21/22 00:00 |
| STATUS | PREFERRED CLIENT | 1 | COMPANY | 06/06/12 04:32 |
| FIRST NAME | MICHAEL | 2 | USER | 03/22/10 09:05 |
| LAST NAME | SCHUMACHER | 2 | USER | 03/22/10 09:07 |
| ⋮ | | | | |

FIG. 2

ARBITRARY DIRECTORY DATA PROPERTIES IN SQL-BASED DIRECTORY SYSTEMS

BACKGROUND

As various software platforms and services grow in capability and complexity, efficient management of various entities (e.g., users, companies) that utilize these platforms and services is an important consideration. One such tool for this purpose is a directory system which is a shared information infrastructure for locating, managing, administering, and organizing network resources in relation to various entities such as a user profile, a company database, and the like. For the sake of discussion, an entity can also be referred to as an object. In a directory system, information about a particular entity and/or object can be stored as a set of properties associated with the entity and/or object. For example, a user can have an associated username, phone number, location, account status, and so forth.

A common approach to implementing a directory system is to utilize a table comprising rows and columns to organize directory data for various entities and/or objects. Users can interact with the table through various methods such as the Structured Query Language (SQL). For instance, each row of the table can be an individual entity while each column contains an associated property. In a specific example, a table can be configured with a column that stores usernames. Accordingly, each different row of the column would contain a username for a different user.

Utilizing a directory system enables many useful features for organizations and individual users alike. For example, a directory system can be used to support an authentication service for granting user access to network resources such as files and computing infrastructure. In another example, an end user or organization can utilize a directory system to synchronize their own databases to streamline recordkeeping and other administrative tasks.

However, as users come to expect more features and robustness from the directory system, the provider of the directory system must add new properties and expand the scope of existing properties to support new functionality. Over time, individual entities can become unwieldy, having thousands and even millions of distinct properties (e.g., thousands and millions of columns in a table). Moreover, not every entity will have a value for each property leading to large amounts of empty space.

SUMMARY

The techniques described herein provide systems for enhancing the efficiency and functionality of directory systems. This is accomplished by introducing extended tables for storing properties of associated entities (e.g., users, companies). As mentioned above, conventional directory system implementations often utilize tables comprising rows and columns to organize directory data. For example, each entity can be assigned a row in the table where each column of the row contains an associated property. In one example, a column stores usernames for entities within the table. However, not every entity in a directory system will have a username to store in the column. Consider a table that stores directory data for individual users as well as larger entities such as a company which may not have a username. For a table containing a large number of entities, this results in many empty fields, and thus, wasted space. This problem is exacerbated when new properties (i.e., new columns) are added to the table since a new property may not be applicable to every entity.

As individual entities expand on the order of thousands and even millions of properties, the growing amount of empty space within the table imposes an undesirable performance impact for important operations. For example, the directory system table can be utilized for user authentication in online platforms and/or services. In response to a login attempt, an authentication program can accordingly search the table for an entity with relevant properties such as a matching username and access permissions. Naturally, the authentication program must be fast and responsive to deliver a good user experience. However, if the authentication program must search through thousands of entities and millions of associated properties, many of which may be empty, the performance and the corresponding user experience is thereby degraded.

In contrast, the present disclosure introduces a directory system architecture that utilizes a primary table and an extended table to reduce wasted space, and thus, improve performance. To enable this technical benefit, a database (e.g., a directory system) is configured with a primary table and an extended table where each row of the extended table defines a respective property for an associated entity contained in the primary table. In addition, the extended table is also configured with an operation set that governs whether an incoming query is processed by the primary table or the extended table.

The database then receives a query that defines an operation on a property of the entities. For example, the query can be an authentication request such as the one mentioned above. In another example, the query can be a synchronization query from an external (e.g., client) database that retrieves recent changes to certain entities. In still another example, the query can be a property extension operation that adds a new property to certain entities and/or entity types.

Accordingly, the query is parsed to determine an operation type which directs the query to either the primary table or the extended table. For instance, the disclosed system can detect that the operation type matches the operation set for the extended table. In response, the query is then processed by the extended table and not the primary table. In various examples, processing the query involves performing the operation on the property defined by the query. In a specific example, the query is a change to a property for a certain entity (e.g., a user's job title). Alternatively, the query can apply a change to several entities such as moving a group of users between departments.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2 illustrates the example of the directory system in FIG. 1 where empty spaces are removed from the primary table.

DETAILED DESCRIPTION

Figure 1:
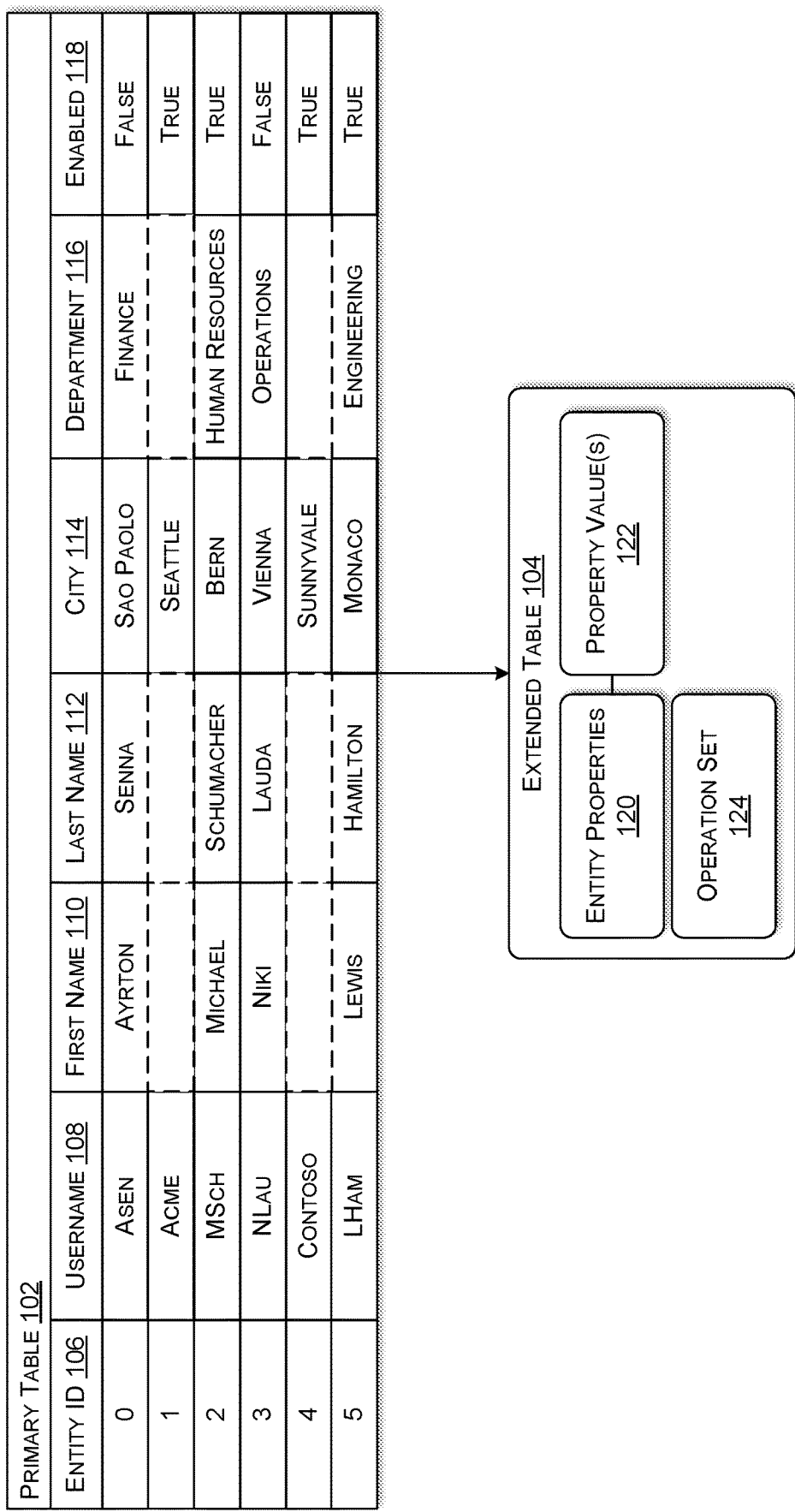
FIG. 1 illustrates an example of a directory system comprising a primary table that is augmented by an extended table.

The techniques described herein enhance databases that implement directory systems by introducing an extended table to augment a primary table that contains various entities. In the context of the present disclosure, an entity is anything having a set of properties that are tracked and/or managed by a directory system database. Accordingly, an entity can include an individual user, a team of users, a business department, an entire company, and so forth.

As mentioned above, contemporary directory systems manage massive amounts of directory data with individual entities having thousands and even millions of associated properties. Consequently, some of these properties are specific to certain types of entities (e.g., users and not companies) and/or support functionality that does not apply to all entities within the primary table. As a result, conventional approaches to directory system organization, which utilize only a primary table to store all entities and properties, must contend with large amounts of empty space.

In contrast, the extended table presented herein serves to alleviate the burden of the primary table by storing properties on a per-entity basis. Stated another way, while the primary table stores an entity as a row with each column defining a certain property, an extended table stores each property as a row with each column further defining aspects of the property. For example, an extended table can include a row for a username. Accordingly, the username row can include a first column that defines the username itself, a second column that defines which entity the username belongs to, a third column that defines time at which the username was last changed and so forth.

By organizing a directory system in this way, much if not all the empty space in the primary table can be eliminated as specific properties for various entities are moved into the extended table. This enables significant performance improvements at the primary table as programs and/or services that utilize the primary table are required to sift through comparatively less data (e.g., hundreds of thousands of properties rather than millions).

In another example of the technical benefit of the present disclosure, the extended table enables additional database features for end users. For example, by including several columns of information for each property, the extended table allows fine grained and/or highly specific query operations. In an illustrative example, a system administrator managing a company database may wish to retrieve usernames that have been updated within the last six weeks. For a conventional system utilizing only a primary table, the system administrator would need to retrieve every entity that had been changed in any way within the last six weeks. The system administrator would then need to manually search the subset of entities to find changed usernames. Without some method of tracking changes (e.g., a changelog, timestamps), such a task is practically impossible. In contrast, by utilizing an extended table, each property is configured with its own column defining the time at which the most recent change was applied. As such, the system administrator need only format a query to specify usernames that have been changed in the last six weeks. In response, the system returns a full set of entities and/or usernames that satisfy the query.

Various examples, scenarios, and aspects that enable arbitrary directory data properties through extended tables are described below with respect to FIGS. 1-7.

FIG. 1 illustrates a directory system 100 in which a primary table 102 is augmented by an extended table 104 to reduce wasted space an improve performance in the primary table 102. As shown in FIG. 1, the primary table 102 stores a plurality of entities which are identified by an entity identification (ID) 106. In various examples, the directory system 100 is utilized by a company to store employee information as well information on associated companies, client organizations, or other partners. Accordingly, each column of the primary table 102 defines a property associated with the entity. For example, entity ID 0 has a username property 108 of "ASen" which corresponds to a first name property 110 "Ayrton" and a last name property 112 "Senna". In addition, a city property 114 indicates that Ayrton Senna is located in "Sao Paolo" and a department property 116 indicates that Ayrton Senna worked in the "Finance" department. However, an account status defined by the enabled property 118 shows that a user account associated with Ayrton Senna is not enabled (i.e., has a value "False") indicating that the user represented by the entity ID 0 is no longer with the company.

Continuing with the example of FIG. 1, while entity ID 0 of the primary table 102 stores information on an individual user, entity ID 1 stores information related to a company. As shown, entity ID 1 has a username 108 "Acme" and is located in "Seattle" as indicated by a city property 114. In various examples, Acme is a client that utilizes the directory system 100 to manage its own database. However, since entity ID 1 is not an individual user, the first name property 110 and the last name property 112 are empty for entity ID 1. Similarly, as Acme is a separate company and not an employee, the department property 116 is empty for entity ID 1. Logically, for a large primary table 102 that stores thousands of entities and millions of properties, the effect of empty space such as the first name property 110, the last name property 112, and the department property 116 (shown with respect to entity ID 1) can grow exponentially.

To eliminate wasted space in the primary table 102, the directory system 100 is configured with an extended table 104. The extended table 104 stores entity properties 120 for entities within the primary table 102. Accordingly, a set of entity properties 120 contains a corresponding set of property values 122 as will be elaborated upon below. In addition, the extended table 104 is configured with an operation set 124 defining types of operations that are handled by the extended table 104. Stated another way, operations that are not part of the operation set 124 are carried out by the primary table 102.

Turning now to FIG. 2, the results of utilizing the extended table 104 as well as additional aspects of the extended table 104 are shown and discussed. As discussed above, configuring the directory system 100 with the extended table 104 eliminates empty (i.e., wasted) space. Consequently, the primary table 202 shown in FIG. 2 sees a significant reduction in size as various properties for the plurality of entities are removed from the primary table 202 and placed in the extended table 104. Within the extended table 104, each property is assigned a row as identified by a property ID 204. In various examples, the property ID 204 can be the name of the associated property (e.g., username, city). Alternatively, the property ID 204 can be an alphanumeric identifier representing the property. In addition, while the extended table 104 illustrated in FIG. 2, comprises a certain number of rows, it should be understood that the extended table 104 can contain any number of rows (i.e., properties).

Since each row of the extended table 104 is a property, each column of the extended table 104 accordingly stores an aspect of the property. For example, the first row of the extended table 104 defines a "city" property 204. Accordingly, the property value 206 defines the city as "Sao Paolo". In addition, an entity ID 208 and an entity type 210 indicate that the city property belongs to entity ID "0" and that entity ID 0 is a "user". Furthermore, the change time column 212 stores a timestamp of the most recent point when the city property was changed (i.e., "05/01/09 15:45"). In various examples, the change time 212 enables the directory system 100 to achieve fine granularity when tracking changes to directory data. Consequently, the directory system 100 can be configured to trigger various actions in response to a single property change. For example, the directory system 100 can detect a change to a "job title" property 204. In response, the directory system 100 can cause a permissions system to grant and/or revoke network privileges based on the updated job title 204. It should be understood that while the property value 206 represents a value (e.g., "Sao Paolo") for an associated property 204 (e.g., "City"), additional information such as the change time 212 is also included in the property values 122 discussed above.

As shown in FIG. 2, some properties such as the "first name" and "last name" are removed from the primary table 202 and stored in separate rows in the extended table 104. Moreover, properties that are specific to a certain entity or type of entity such as the "job title" property can be stored in the extended table 104 with no impact on the primary table 202. In this way, detailed directory information for various entities can be collected and stored in the extended table 104 without adding to the primary table 202. As such, performance and time-sensitive tasks that utilize the primary table 202 do not suffer increased latency incurred when searching a large volume of data. Furthermore, the extended table 104 can include a row for a "deletion" property. The "deletion" property can indicate whether an associated entity has been deleted. This enables the directory system 100 to streamline entity lifecycle management via a deletion property which services as a tombstone record. Rather than keep all data associated with the entity, the directory system 100 can simply refer to the deletion property. Consequently, the volume of data managed by the directory system 100 is further reduced leading to improved efficiency.

While FIG. 2 illustrates a single extended table 104 that includes rows for different types of entities (e.g., users, companies, business departments, teams), it is understood in the context of this disclosure that a plurality of extended tables can be created for the different types of entities in the primary table 202. For example, a first extended table can store properties for users, a second extended table can store properties for companies, and so forth. Moreover, operation sets can vary between different extended tables. For instance, the first extended table that stores properties for users can include an operation set that is different from the second extended table that stores properties for companies.

Similarly, while FIG. 2 illustrates a single primary table 202 that stores various entities (e.g., users, companies) and associated properties, it is further understood in the context of the present disclosure that a plurality of primary tables can be utilized instead of a single primary table 202. For instance, a first primary table can store entities representing individual users, a second primary table can store entities representing companies, and so forth. Accordingly, the plurality of primary tables can be associated with a single extended table 104 that stores additional properties for each primary table that stores different types of entities.

Figure 3:
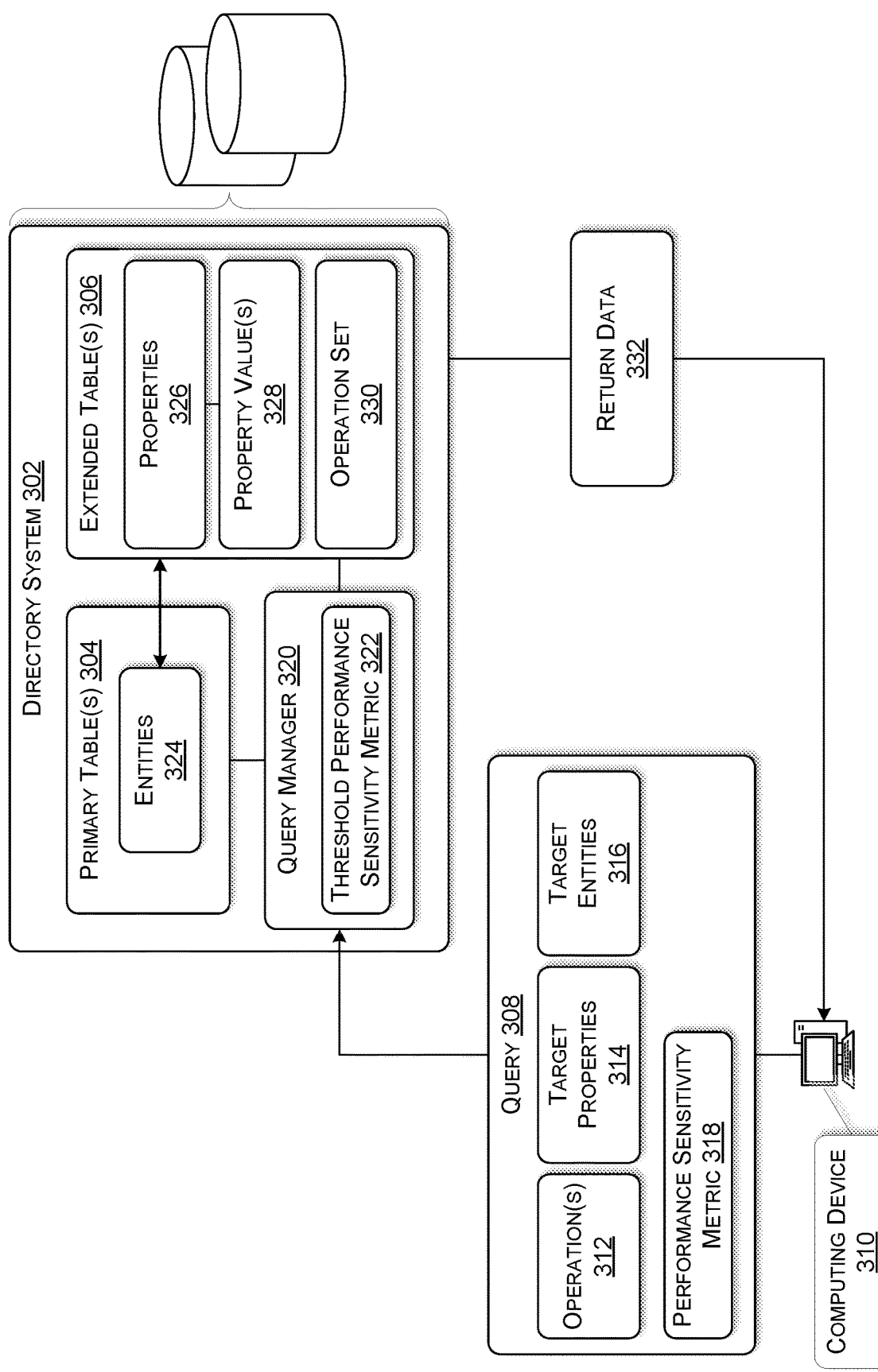
FIG. 3 is a block diagram of a system for receiving and processing queries using a directory system comprising a primary table and an extended table.

Turning now to FIG. 3, an operational flow for utilizing a directory system 302 configured with a primary table 304 and an extended table 306 to process a query 308 is shown and described. In various example, the directory system 302 receives query 308 from a computing device 310. The computing device 310 can be a user device such as a laptop, a desktop computer, and/or a smartphone. Alternatively, the computing device 310 can be a server belonging to an organization that utilizes the directory system 302 (e.g., via a subscription) for managing internal databases. The query 308 defines various fields that are parsed by the directory system 302 including an operation 312 along with certain target properties 314 and/or target entities 316. In an Illustrative example, the query 308 can execute a username change initiated by a user or a system administrator. Accordingly, the query 308 defines the operation 312 as a username change, the target property 314 as a username, and the target entity 316 as the specific entity associated with the user.

In addition, the query 308 can include a performance sensitivity metric 318. The performance sensitivity metric 318 quantifies a level of performance required by the query 308 based on the operation 312, the target property 314, and/or the target entity 316. For example, the query 308 can define an authentication operation 312 where the target property 314 is a username and the target entity 316 is a user. As mentioned above, user authentication is a key aspect of a smooth user experience in online platforms and/or services and, is thus, time sensitive. As such, the query 308 is assigned a performance sensitivity metric 318 such that when the query 308 is analyzed by a query manager 320, the performance sensitivity metric 318 satisfies (e.g., meets or exceeds) a threshold performance sensitivity metric 322. In response to the performance sensitivity metric 318 that satisfies the threshold performance sensitivity metric 322, the query manager 320 directs the query 308 to the primary table 304 for processing using the entities 324 and not the extended table 306.

Conversely, a different query 308 may define a username lookup operation 312 where the target property 314 is also a username and the target entity 316 is a user. However, because a username lookup is not necessarily a time sensitive operation 312, the performance sensitivity metric 318 may not satisfy (e.g., falls below) the threshold performance sensitivity metric 322. In response, the query 308 is directed to the extended table 306 by the query manager 320. Accordingly, the directory system 302 searches the properties 326 within the extended table 306 for a property value 328 that matches the target property 314 and/or a target entity 316. As shown above, data can be duplicated between the primary table 304 and the extended table 306 to support different types of operations 312. Stated another way, a property 326 can be stored in both the primary table 304 and the extended table 306. In this way, while various operations 312 may request the same information (e.g., target properties 314), they can be processed differently based on the performance sensitivity metric 318.

In another example, the operation 312 matches an operation set 330 of the extended table 306. For example, a query 308 can define an operation 312 to retrieve any job title properties 326 that have been changed within the last six months. As discussed above, the properties 326 stored in the extended table can each have a change time 212. In contrast, the primary table 304 does not store a change time 212. As such, the query 308 is processed by the extended table 306. The directory system 302 subsequently provides return data 332 that satisfies the query 308. In the present example, the return data 332 can be entity IDs and/or usernames of entities that have a job title property 326 that was changed within the last six months.

Figure 4A:
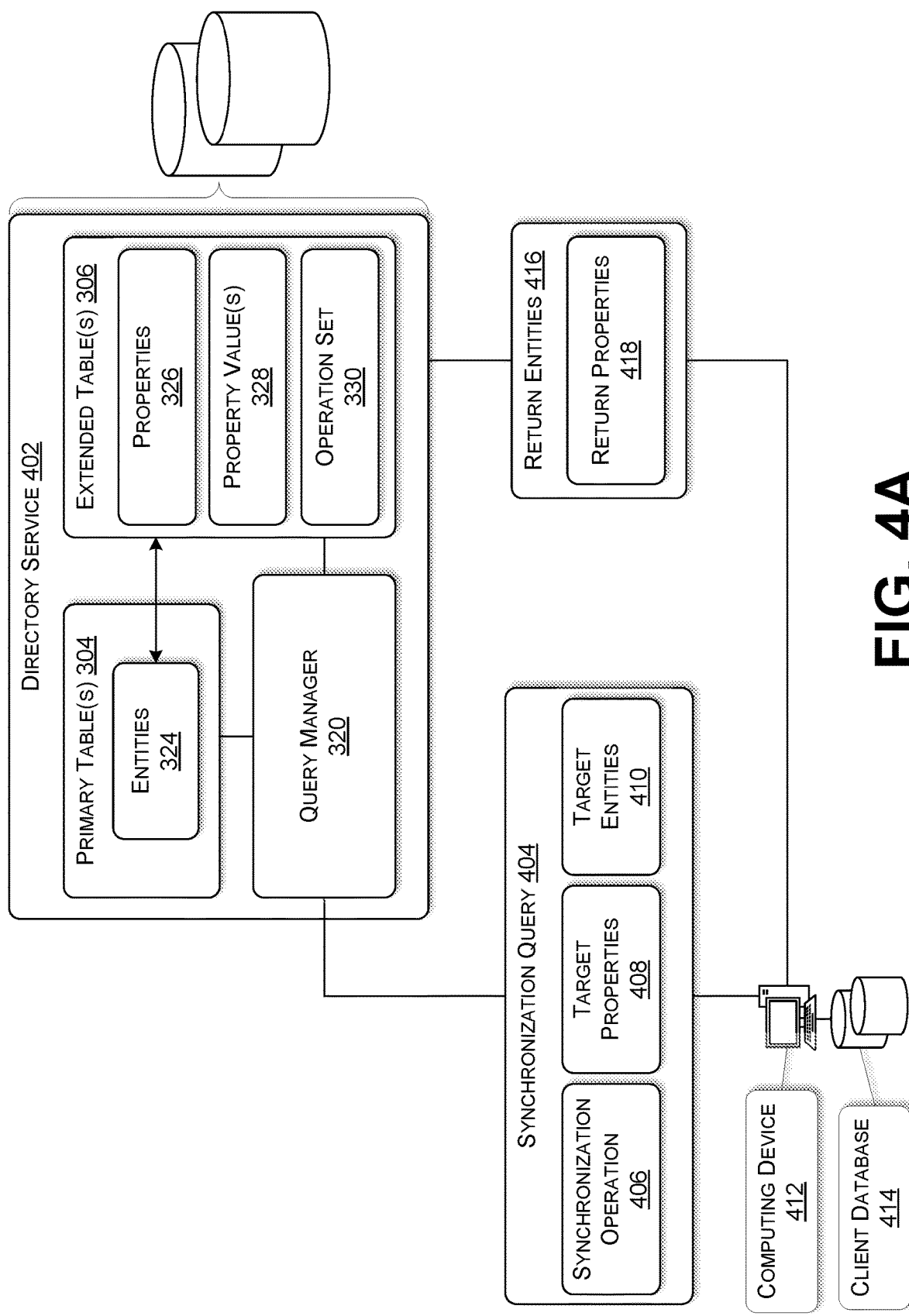
FIG. 4A illustrates an example of processing a synchronization query using the directory system comprising a primary table and an extended table.

Proceeding to FIG. 4A an example operation in which a directory system 402 processes a synchronization query 404 is shown and described. As shown, the synchronization query 404 incudes a synchronization operation 406 along with target properties 408 and/or target entities 410. In addition, the synchronization query 404 can originate from a computing device 412 that manages a client database 414 or other downstream data store. For example, the client database 414 can belong to a company that utilizes the directory service 402 to manage and organize employee information. In various examples, the synchronization query 404 is generated automatically at regular time intervals (e.g., once per week) to update the client database 414 with the most current information from the directory service 402. As such, the target properties 408 and target entities 410 are left unspecified and instead the synchronization query 404 simply requests any properties 326 and/or entities 324 that have been modified since the previous synchronization.

In an alternative example, the synchronization query 404 requests specific target properties 408 from the directory service 402 such as usernames, job titles, and the like. In another example, the synchronization query 404 requests specific target entities 410 from the directory service 402 without regard to timeframe. For example, the company running the client database 414 may request a synchronization for entities 324 and/or properties 326 related to its employees regardless of whether those entities 324 and/or properties 326 had been changed.

Due to the property-specific nature of the synchronization operation 406, the query manager 320 directs the synchronization query 404 to the extended table 306. In response, the directory service searches the extended table 306 for properties 326 and/or property values 328 that satisfy the synchronization query 404. For example, the synchronization query 404 may request any entities 324 whose properties were changed within the past four weeks. Accordingly, the directory service 402 searches the extended table 306 for properties 326 having property values 328 that fall within the past four weeks. This can be identified using the change times 212 discussed above with respect to FIG. 2. Once identified, the directory system 402 outputs return entities 416 having return properties 418 that satisfy the synchronization query 404. It should be understood that the return entities 416 can include some or all of the entities 324 stored in the primary table 304.

Figure 4B:
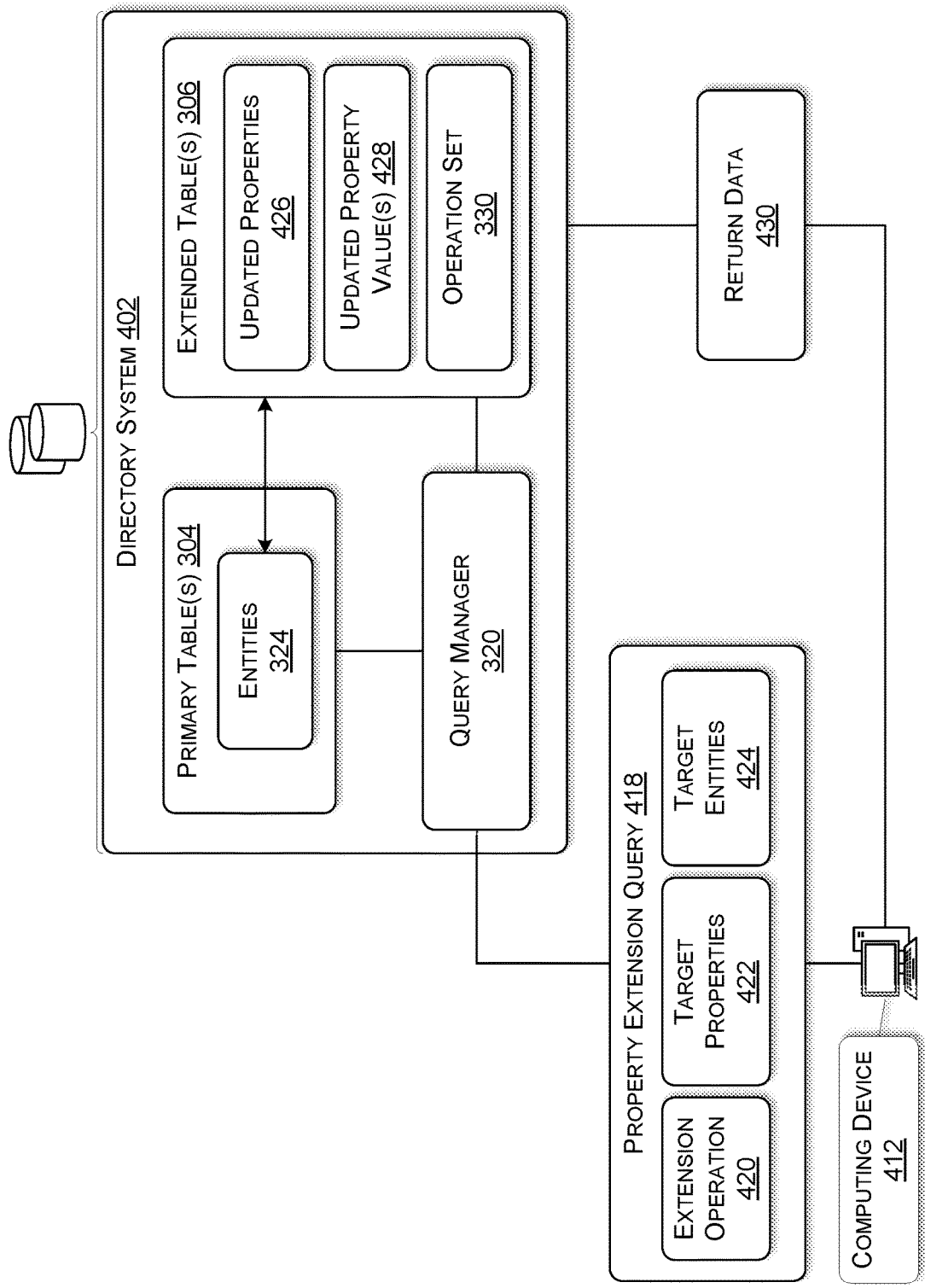
FIG. 4B illustrates an example of processing a property extension query using the directory system comprising a primary table and an extended table.

Turning now to FIG. 4B, an example operation in which the directory system 402 processes a property extension query 418 is shown and described. Similar to the examples discussed above with respect to FIG. 4A, the property extension query 418 defines an extension operation 420, and a corresponding target property 422 and/or target entities 424. In various examples, an extension operation 420 can involve creating a new property and/or expanding the information defined by existing properties. In an illustrative example, consider the extended table 104A as illustrated in FIG. 2. To add a new property, the extension operation 420 appends a row to the extended table 104. Alternatively, to expand the information defined by existing properties such as the "first name" property 204, the extension operation appends a column to the extended table 104.

With respect to FIG. 4B, the property extension query 418 is received by the directory system 402 and analyzed by a query manager 320. In response to detecting the extension operation 420, the query manager 320 can determine that the extension operation 420 matches the operation set 330 of the extended table 306. Consequently, the property extension query 418 is processed by the directory system 402 using the extended table 306. The extension operation 420 is then performed on the extended table 306 resulting a set of updated properties 426 having an associated set of updated property values 428. In addition, the directory system 402 can provide a set of return data 430 after the extension operation 420 is performed. In various examples, the return data 430 can confirm the extension operation 430 was successful, define which of the updated properties 426 were changed, the updated property values 428, and so forth.

Figure 4C:
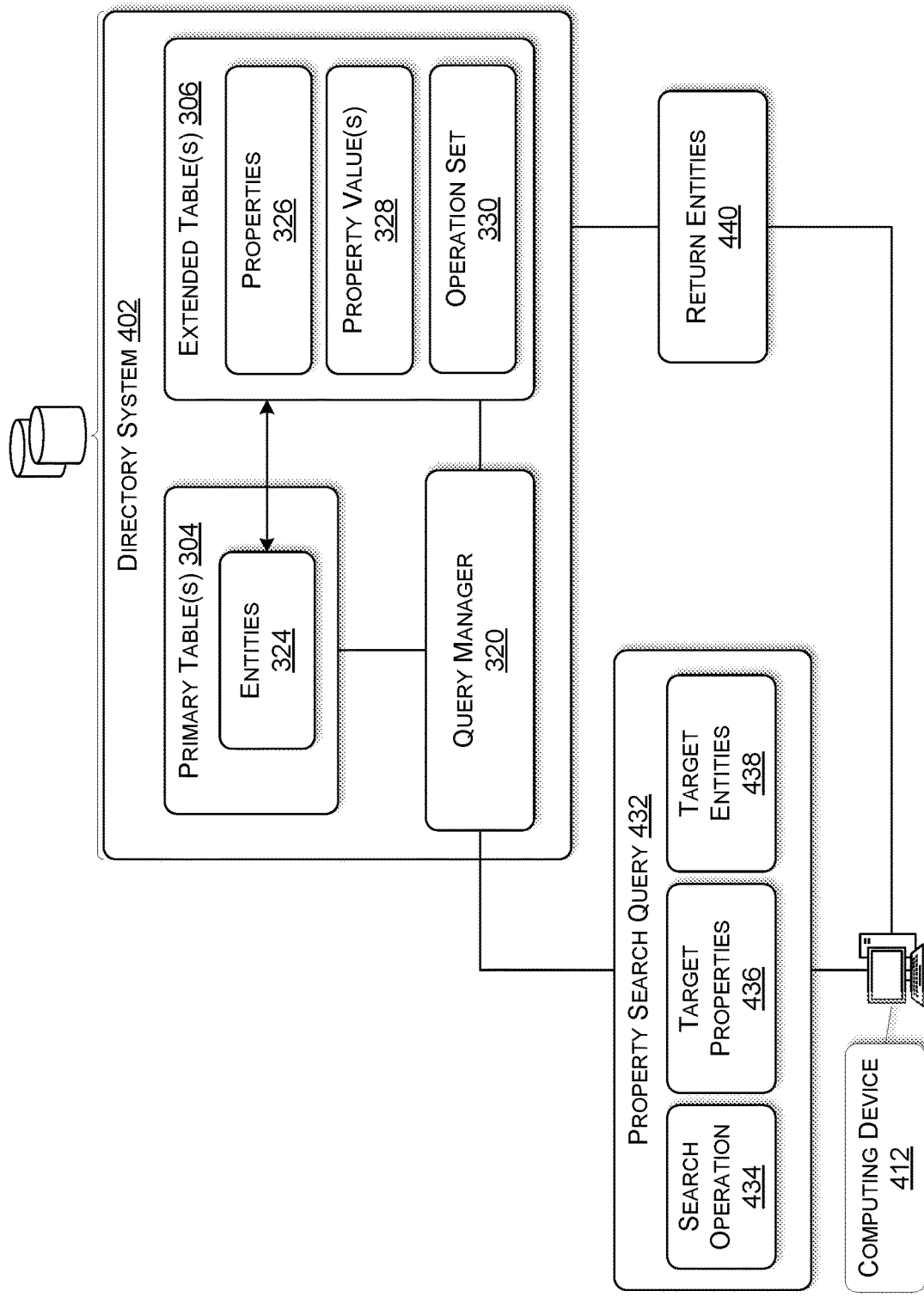
FIG. 4C illustrates an example of processing a property search query using the directory system comprising a primary table and an extended table.

Proceeding to FIG. 4C, an example operation in which the directory system 402 processes a property search query 432 is shown and described. As shown, the property search query 432 defines a search operation 434 as well as target properties 436 of the search operation 434 and/or target entities 438. In various examples, the property search query 432 can be formatted to query the directory system 402 for target properties 436 without specifying target entities 438. Stated another way, the operation set 330 of the extended table 306 enable ambiguous name resolution when performing search operations 434. For instance, a target property 436 can specify a department within a company (e.g., finance, engineering), a certain job title, a first name or other property 326. In response, the directory system 402 can determine which of the extended table 306 include properties 326 that match the target properties 436. Accordingly, the directory system 402 transmits a set of return entities 440 that satisfy the property search query 432. As discussed above, individual properties 326 are stored within the extended table 306 as correspondingly individual rows. Organizing the properties 326 in this way enables the extended table 306 to streamline search operations 434 by supporting simplified SQL queries that utilize a single column of an extended table 306 rather than an arbitrary number of columns in a primary table 304.

Figure 5:
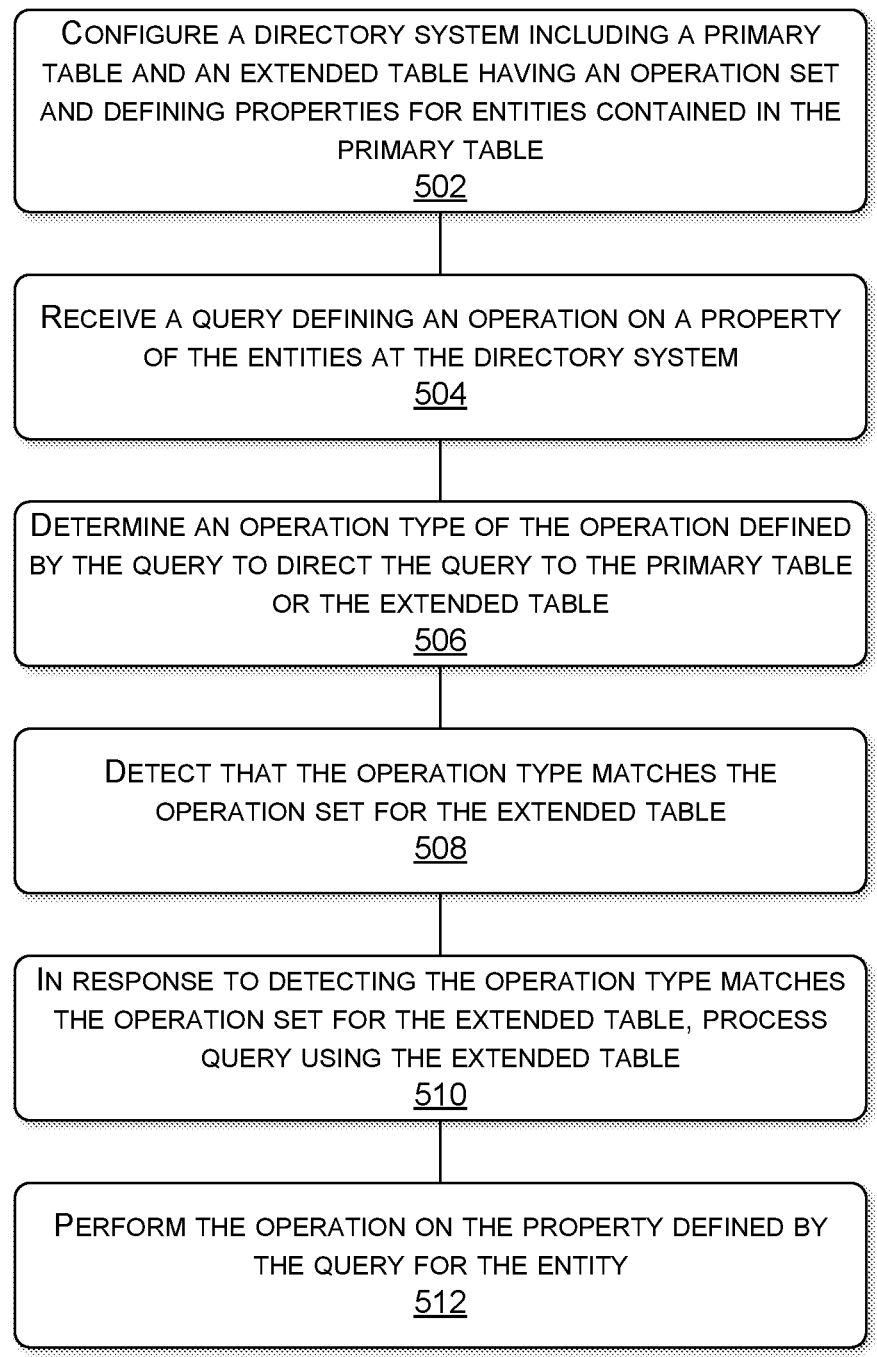
FIG. 5 is a flow diagram showing aspects of a routine for processing queries using a directory system comprising a primary table and an extended table.

Proceeding to FIG. 5, aspects of a routine 500 for enabling arbitrary directory data properties in SQL-based directory systems are shown and described. With reference to FIG. 5, the routine 500 begins at operation 502 where a system configures a directory system that includes a primary table and an extended table that has an operation set and which defines properties for a plurality of entities contained in the primary table.

Next, at operation 504, the directory system receives a query defining an operation on a property of the plurality of entities.

Then, at operation 506, the system determines an operation type of the operation defined by the query to direct the query to the primary table or the extended table.

Next, at operation 508, the system determines that the operation type matches the operation set of the extended table.

Subsequently, at operation 510, in response to determining that the operation type matches the operation set of the extended table, the directory system processes the query using the extended table.

Finally, at operation 512, the directory system executes the operation on the property defined by the query for an entity of the plurality of entities.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 may be also implemented in other ways. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
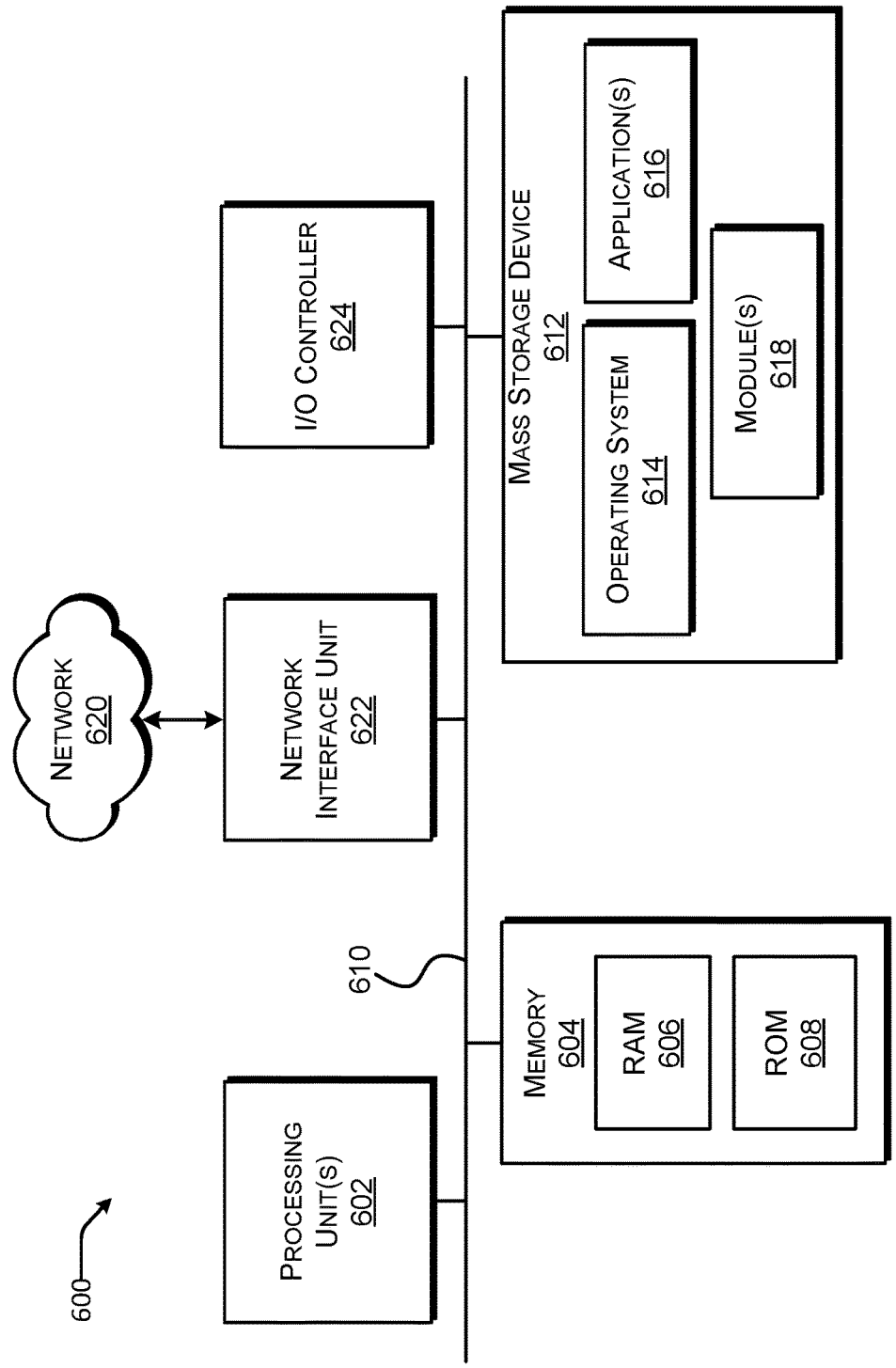
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
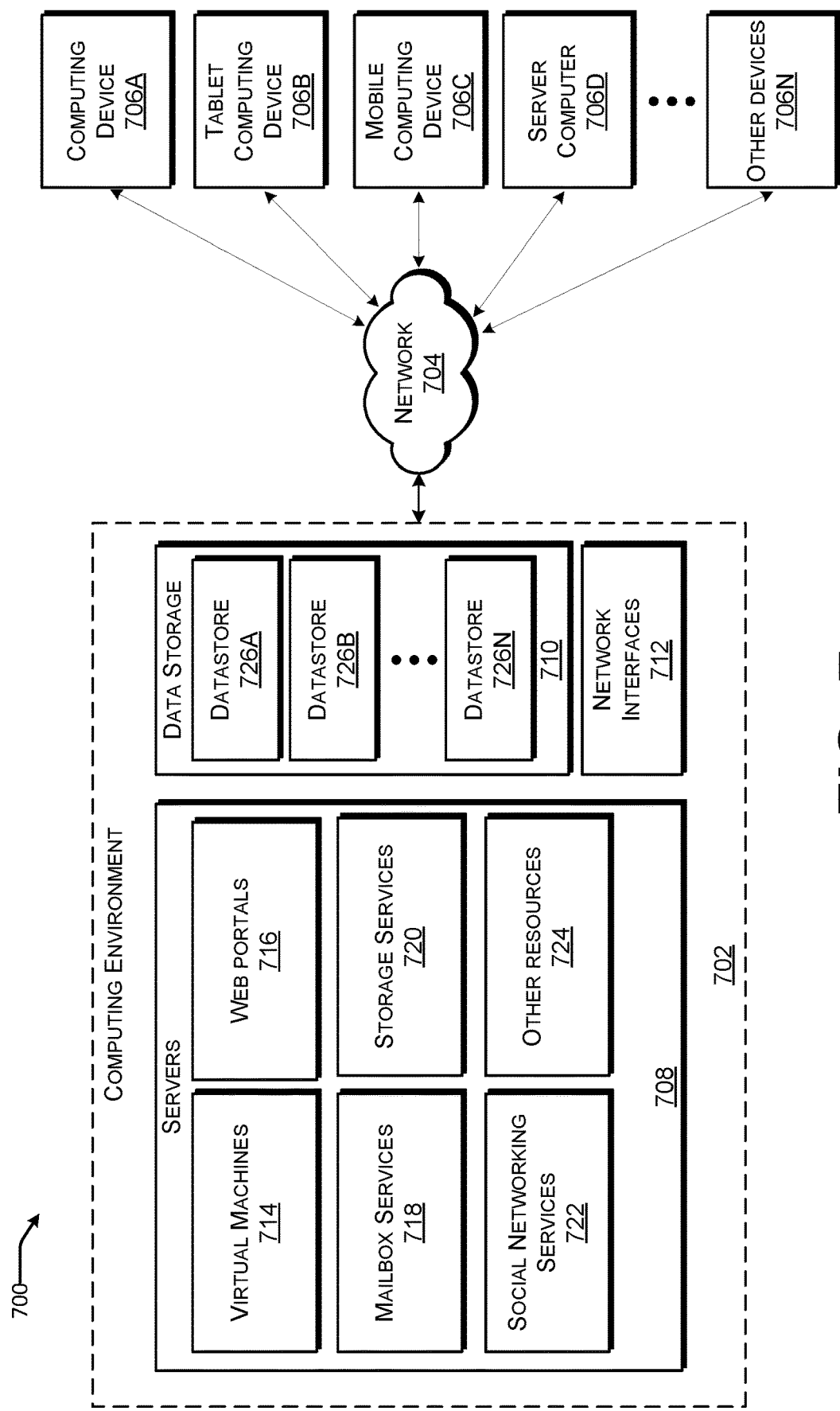
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: configuring a directory system including a primary table and an extended table having an operation set and defining properties for each of a plurality of entities contained in the primary table; receiving a query at the directory system, the query defining an operation on a property of the plurality of entities; determining an operation type of the operation to direct the query to the primary table or the extended table; detecting that the operation type matches the operation set for the extended table; in response to detecting that the operation type matches the operation set for the extended table, processing the query using the extended table; and performing the operation on the property defined by the query for an entity of the plurality of entities.

Example Clause B, the method of Example Clause A, wherein the extended table comprises a plurality of rows, each row of the plurality of rows defining a property of an associated entity.

Example Clause C, the method of Example Clause A or Example Clause B, wherein the operation defined by the query includes a performance sensitivity metric.

Example Clause D, the method of Example Clause C, further comprising: determining that the performance sensitivity metric does not satisfy a threshold; and in response to the performance sensitivity metric not satisfying the threshold, directing the query to the extended table.

Example Clause E, the method of any one of Example Clause A through D, further comprising: receiving another query at the directory system, the other query defining another operation on another property of the plurality of entities and the operation including a performance sensitivity metric; determining that the performance sensitivity metric of the other query satisfies a threshold; and directing the other query to the primary table in response to determining that the performance sensitivity metric satisfies the threshold.

Example Clause F, the method of any one of Example Clause A through E, wherein the operation set of the extended table includes an entity property search.

Example Clause G, the method of any one of Example Clause A through F, further comprising: receiving a user input creating a property for an entity; and in response to the user input, appending a row defining the property to the extended table.

Example Clause H, a system comprising: a processing unit; a computer-readable medium having encoded thereon computer-readable instructions that, when executed by the processing unit, cause the system to: configure a directory system including a primary table and an extended table having an operation set and defining properties for each of a plurality of entities contained in the primary table; receive a query at the directory system, the query defining an operation on a property of the plurality of entities; determine an operation type of the operation to direct the query to the primary table or the extended table; detect that the operation type matches the operation set for the extended table; in response to detecting that the operation type matches the operation set for the extended table, process the query using the extended table; and perform the operation on the property defined by the query for an entity of the plurality of entities.

Example Clause I, the system of Example Clause H, wherein the extended table comprises a plurality of rows, each row of the plurality of rows defining a property of an associated entity.

Example Clause J, the system of Example Clause H or Example Clause I, wherein the operation defined by the query includes a performance sensitivity metric.

Example Clause K, the system of Example Clause J, wherein the computer-readable instructions further cause the system to: determine that the performance sensitivity metric does not satisfy a threshold; and in response to the performance sensitivity metric not satisfying the threshold, directing the query to the extended table.

Example Clause L, the system of any one of Example Clause H through K, wherein the computer-readable instructions further cause the system to: receive another query at the directory system, the other query defining another operation on another property of the plurality of entities and the operation including a performance sensitivity metric; determine that the performance sensitivity metric of the other query satisfies a threshold; and direct the other query to the primary table in response to determining that the performance sensitivity metric satisfies the threshold.

Example Clause M, the system of any one of Example Clause H through L, wherein the operation set of the extended table includes an entity property search.

Example Clause N, the system of any one of Example Clause H through M, wherein the computer-readable instructions further cause the system to: receive a user input creating a property for an entity; and in response to the user input, append a row defining the property to the extended table.

Example Clause O, a computer-readable storage medium having encoded thereon computer-readable instructions that, when executed by a processing unit, causes a system to: configure a directory system including a primary table and an extended table having an operation set and defining properties for each of a plurality of entities contained in the primary table; receive a query at the directory system, the query defining an operation on a property of the plurality of entities; determine an operation type of the operation to direct the query to the primary table or the extended table; detect that the operation type matches the operation set for the extended table; in response to detecting that the operation type matches the operation set for the extended table, process the query using the extended table; and perform the operation on the property defined by the query for an entity of the plurality of entities.

Example Clause P, the computer-readable storage medium of Example Clause O, wherein the extended table comprises a plurality of rows, each row of the plurality of rows defining a property of an associated entity.

Example Clause Q, the computer-readable storage medium of Example Clause O or Example Clause P, wherein the operation defined by the query includes a performance sensitivity metric.

Example Clause R, the computer-readable storage medium of Example Clause Q, wherein the computer-readable instructions further cause the system to: determine that the performance sensitivity metric does not satisfy a threshold; and in response to the performance sensitivity metric not satisfying the threshold, directing the query to the extended table.

Example Clause S, the computer-readable storage medium of any one of Example Clause O through R, wherein the computer-readable instructions further cause the system to: receive another query at the directory system, the other query defining another operation on another property of the plurality of entities and the operation including a performance sensitivity metric; determine that the performance sensitivity metric of the other query satisfies a threshold; and direct the other query to the primary table in response to determining that the performance sensitivity metric satisfies the threshold.

Example Clause T, the computer-readable storage medium of any one of Example Clause O through S, wherein the operation set of the extended table includes an entity property search.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different queries).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method comprising:
configuring a directory system including a primary table and an extended table, the extended table having an operation set and defining properties for each of a plurality of entities contained in the primary table;
receiving a query at the directory system, the query defining an operation on a property of an individual entity of the plurality of entities and a performance sensitivity metric quantifying a computational performance requirement associated with the query, wherein the performance sensitivity metric is calculated by the directory system based on an operation type of the operation;
determining that the performance sensitivity metric does not satisfy a threshold performance sensitivity metric, wherein the threshold performance sensitivity metric delineates a level of performance provided by the directory system when processing queries;
determining that the operation type matches the operation set for the extended table;
in response to determining that the operation type matches the operation set for the extended table and that the performance sensitivity metric does not satisfy the threshold performance sensitivity metric, processing the query using the extended table; and
performing the operation on the property defined by the query for the individual entity of the plurality of entities.

2. The method of claim 1, wherein:
the extended table comprises a plurality of rows; and
an individual row of the plurality of rows defines a property of an associated individual entity.

3. The method of claim 1, wherein:
the query is a first query;
the operation is a first operation;
the individual entity is a first individual entity; and
the performance sensitivity metric is a first performance sensitivity metric, the method further comprising:
receiving a second query at the directory system, wherein the second query:
defines a second operation on a second individual property of the plurality of entities; and
includes a second performance sensitivity metric;
determining that the second performance sensitivity metric of the second query satisfies the threshold performance sensitivity metric; and
directing the second query to the primary table in response to determining that the second performance sensitivity metric satisfies the threshold performance sensitivity metric.

4. The method of claim 1, wherein the operation set of the extended table includes an entity property search.

5. The method of claim 1, further comprising:
receiving a user input creating a property for an individual entity; and
in response to the user input, appending a row defining the property to the extended table.

6. A system comprising:
a processing unit;
a computer-readable medium having encoded thereon computer-readable instructions that, when executed by the processing unit, cause the system to:
configure a directory system including a primary table and an extended table, the extended table having an operation set and defining properties for each of a plurality of entities contained in the primary table;
receive a query at the directory system, the query defining an operation on a property of an individual entity the plurality of entities and a performance sensitivity metric quantifying a computational performance requirement associated with the query, wherein the performance sensitivity metric is calculated by the directory system based on an operation type of the operation;

determining that the performance sensitivity metric does not satisfy a threshold performance sensitivity metric, wherein the threshold performance sensitivity metric delineates a level of performance provided by the directory system when processing queries;

determine that the operation type matches the operation set for the extended table;

in response to determining that the operation type matches the operation set for the extended table and that the performance sensitivity metric does not satisfy the threshold performance sensitivity metric, process the query using the extended table; and perform the operation on the property defined by the query for the individual entity of the plurality of entities.

7. The system of claim 6, wherein:
the extended table comprises a plurality of rows; and
an individual row of the plurality of rows defines a property of an associated individual entity.

8. The system of claim 6, wherein;
the query is a first query; and
the operation is a first operation;
the individual entity is a first individual entity;
the performance sensitivity metric is a first performance sensitivity metric; and
the computer-readable instructions further cause the system to:
receive a second query at the directory system, wherein the second query:
defines a second operation on a second individual property of the plurality of entities; and
includes a second performance sensitivity metric;
determine that the second performance sensitivity metric of the second query satisfies the threshold performance sensitivity metric; and
direct the second query to the primary table in response to determining that the second performance sensitivity metric satisfies the threshold performance sensitivity metric.

9. The system of claim 6, wherein the operation set of the extended table includes an entity property search.

10. The system of claim 6, wherein the computer-readable instructions further cause the system to:
receive a user input creating a property for an individual entity; and
in response to the user input, append a row defining the property to the extended table.

11. A computer-readable storage medium having encoded thereon computer-readable instructions that, when executed by a processing unit, causes a system to:

configure a directory system including a primary table and an extended table, the extended table having an operation set and defining properties for each of a plurality of entities contained in the primary table;

receive a query at the directory system, the query defining an operation on a property of an individual entity of the plurality of entities and a performance sensitivity metric quantifying a computational performance requirement associated with the query, wherein the performance sensitivity metric is calculated by the directory system based on an operation type of the operation;

determining that the performance sensitivity metric does not satisfy a threshold performance sensitivity metric, wherein the threshold performance sensitivity metric delineates a level of performance provided by the directory system when processing queries;

determine that the operation type matches the operation set for the extended table;

in response to determining that the operation type matches the operation set for the extended table and that the performance sensitivity metric does not satisfy the threshold performance sensitivity metric, process the query using the extended table; and perform the operation on the property defined by the query for the individual entity of the plurality of entities.

12. The computer-readable storage medium of claim 11, wherein;
the extended table comprises a plurality of rows; and
an individual row of the plurality of rows defines a property of an associated individual entity.

13. The computer-readable storage medium of claim 11, wherein:
the query is a first query; and
the operation is a first operation;
the individual entity is a first individual entity;
the performance sensitivity metric is a first performance sensitivity metric; and
the computer-readable instructions further cause the system to:
receive a second query at the directory system, wherein the second query:
defines a second operation on a second individual property of the plurality of entities; and
includes a second performance sensitivity metric;
determine that the second performance sensitivity metric of the second query satisfies the threshold performance sensitivity metric; and
direct the second query to the primary table in response to determining that the second performance sensitivity metric satisfies the threshold performance sensitivity metric.

14. The computer-readable storage medium of claim 11, wherein the operation set of the extended table includes an entity property search.

* * * * *